US009535641B2

United States Patent
Amir et al.

(10) Patent No.: US 9,535,641 B2
(45) Date of Patent: Jan. 3, 2017

(54) RANKING PRINT JOBS BASED ON TRANSFER MEDIA HEALTHY AREA

(71) Applicant: Hewlett-Packard Indigo, B.V., Amstelveen (NL)

(72) Inventors: Gideon Amir, Ness Ziona (IL); Dror Kella, Ness Ziona (IL); Michel Assenheimer, Ness Ziona (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

(21) Appl. No.: 14/899,964

(22) PCT Filed: Jun. 19, 2013

(86) PCT No.: PCT/EP2013/062810
§ 371 (c)(1),
(2) Date: Dec. 18, 2015

(87) PCT Pub. No.: WO2014/202138
PCT Pub. Date: Dec. 24, 2014

(65) Prior Publication Data
US 2016/0139864 A1    May 19, 2016

(51) Int. Cl.
G03G 15/00 (2006.01)
G06F 3/12 (2006.01)
G03G 15/16 (2006.01)

(52) U.S. Cl.
CPC ......... *G06F 3/1263* (2013.01); *G03G 15/1605* (2013.01); *G03G 15/50* (2013.01); *G03G 15/553* (2013.01); *G06F 3/1208* (2013.01); *G06F 3/1282* (2013.01); *G03G 2215/00126* (2013.01); *G03G 2215/00734* (2013.01); *G03G 2215/00738* (2013.01)

(58) Field of Classification Search
CPC .... G06F 3/1263; G06F 3/1208; G06F 3/1296; G03G 15/5012; G03G 15/50; G03G 15/5016; G03G 15/5054; G03G 2215/00126
USPC ...................... 399/31, 81, 82; 358/1.13, 1.18
See application file for complete search history.

(56) References Cited

U.S. PATENT DOCUMENTS 6,108,499 A    8/2000 Cernusak
7,296,870 B2   11/2007 Tyson et al.
7,742,185 B2   6/2010 Lofthus et al.
(Continued)

FOREIGN PATENT DOCUMENTS

JP    2001356647    12/2001
JP    2008268356    11/2008
(Continued)

OTHER PUBLICATIONS

Machine Translation of JP 2001-356647.*
(Continued)

*Primary Examiner* — Robert Beatty
(74) *Attorney, Agent, or Firm* — HP Inc. Patent Department

(57) ABSTRACT

In an embodiment, a processor-readable medium stores code representing instructions that when executed by a processor cause the processor to access a list of print jobs for printing. The processor further determines a healthy area of a transfer media. For each job in the list, the processor calculates an image risk area (IRA) based on the healthy area, and ranks each job in a print order according to its IRA.

12 Claims, 6 Drawing Sheets

(56) References Cited

U.S. PATENT DOCUMENTS

| | | | |
|---|---|---|---|
| 7,995,936 B2 | 8/2011 | Hamby et al. | |
| 8,218,170 B2 | 7/2012 | Klopsch et al. | |
| 2004/0234281 A1 | 11/2004 | Yoshida et al. | |
| 2009/0297177 A1 | 12/2009 | Shimizu | |
| 2012/0076515 A1 | 3/2012 | Rapkin et al. | |
| 2012/0300231 A1 | 11/2012 | Honeck et al. | |
| 2013/0163033 A1* | 6/2013 | Sandler | G06F 3/1208 358/1.15 |
| 2016/0210087 A1* | 7/2016 | Amir | G06F 3/1217 |

FOREIGN PATENT DOCUMENTS

| | | |
|---|---|---|
| JP | 2010145636 | 7/2010 |
| JP | 2012037541 | 2/2012 |

OTHER PUBLICATIONS

International Search Report and Written Opinion dated Feb. 7, 2014, PCT Patent Application No. PCT/EP2013/062810 filed Jun. 19, 2013, European Patent Office.
Microsoft Corporation, "When to Use a Print Server", 13 pages, Nov. 2004.
https://www.google.co.in/url?sa=t&rct=j&q=&esrc=s&source=web&cd=6&cad=rja&ved=0CFgQFjAF&url=http%3A%2F%2Fdownload.microsoft.com%2Fdownload%2F6%2F6%2Fa%2FS6ab0a8f-8418-47bc-9c4f-b2c341ac3591%2Fwhen%2520to%2520Use%2520a%2520Print%2520Server.doc&ei=i2ttUbD7I8WPrgeTmlHoAg&usg=AFQjCNEzqv0l-XAqqhvnJq-Ym90Us3cOXQ&sig2=cNuaBXu0MFKloQA9O4lqFw&bvm=bv.45175338,d.bmk.

* cited by examiner

| Print Job | Duplex Y/N | Substrate Type | Coated Y/N | Length [mm] | Width [mm] | Thickness [um] | Page Count | Impressions Count | Collated Y/N |
|---|---|---|---|---|---|---|---|---|---|
| 1 | N | 170 matt | Y | 450 | 320 | 180 | 500 | 2000 | N |
| 2 | N | 130 gloss | Y | 420 | 297 | 150 | 200 | 1600 | Y |
| 3 | N | 135 | Y | 450 | 320 | 120 | 250 | 1250 | N |
| 4 | N | 230 | N | 420 | 266 | 210 | 350 | 700 | N |
| 5 | N | 170 matt | Y | 420 | 297 | 180 | 300 | 720 | N |

| Length [mm] | Wear | Defect |
|---|---|---|
| 450 | 510K | Yes |
| 420 | 517K | Yes | a.

| Width [mm] | Wear | Defect |
|---|---|---|
| 320 | 510K | Yes |
| 297 | 370K | No |
| 266 | 147K | No | b.

| Job Type | Healthy Area | |
|---|---|---|
| | Length [mm] | Width [mm] |
| Simplex | 423 | 326 |
| Duplex | 430 | 326 | c.

FIG. 5

702 — Calculate a healthy area of an image transfer blanket:
- calculating wear as a cumulative thickness of print media printed on the image transfer blanket;
- determining a defect in the image transfer blanket when the wear exceeds a threshold; and
- establishing a length dimension and width dimension of the healthy area based on lengths and widths of print media whose cumulative thickness caused the wear to exceed the threshold.

704 — Calculate an image risk area (IRA) as an amount of a print job image area that falls outside of the healthy area of the image transfer blanket:
- wherein the print job image area has width, W, and length, L, and the healthy area has width, $W_{HA}$, and length, $L_{HA}$,
- and the IRA is calculated from an equation selected from the group consisting of, IRA = 0, IRA = ($W_{HA}$ × $L_{HA}$) - (W × L), IRA = (L - $L_{HA}$) × W, and, IRA = (W - $W_{HA}$) × L.

706 — Rank the print job in a print order so that it is above other print jobs having larger IRAs and below other print jobs having smaller IRAs.

708 — Calculate a potential damage area (PDA) as an amount of the healthy area not covered by the print job image area:
- wherein the print job image area has width, W, and length, L, and the healthy area has width, $W_{HA}$, and length, $L_{HA}$,
- and the PDA is calculated from an equation selected from the group consisting of, PDA = 0, PDA = ($W_{HA}$ × $L_{HA}$) - (W × L), PDA = |W - $W_{HA}$| × $L_{HA}$, and, PDA = |L - $L_{HA}$| × $W_{HA}$.

710 — Where the IRA of the print job is the same as an IRA of a second print job, rank the print job:
- above the second print job when the PDA is smaller than a PDA of the second print job,
- below the second print job when the PDA is larger than the PDA of the second print job, and
- even with the second print job when the PDA is the same as the PDA of the second print job.

FIG. 7

RANKING PRINT JOBS BASED ON TRANSFER MEDIA HEALTHY AREA

CLAIM FOR PRIORITY

The present application is a national stage filing under 35 U.S.C. §371 of PCT application number PCT/EP2013/062810, having an international filing date of Jun. 19, 2013, the disclosure of which is hereby incorporated by reference in its entirety.

BACKGROUND

Some printing devices, including liquid electro-photography (LEP) printing devices, employ image transfer media such as image transfer blankets. An image transfer blanket receives images formed on a photo imaging member, or from an inkjet system or other digital means, and transfers the images onto print media, such as cut sheet media or a continuous media web. Blanket wear mechanisms related to the printed images and the types of media substrates being used, cause the blanket to wear. As the number of same printed images increases, the blanket wear increases and eventually appears as a defect on other printed images. In order to avoid this adverse impact on print quality, printing device operators often replace image transfer blankets at regular intervals once the number of printed images increases beyond a certain threshold level. Furthermore, if blanket wear begins to cause defects on the printed images prior to reaching the threshold, device operators are likely to replace the image transfer blanket even sooner. Unfortunately, replacing image transfer blankets is expensive and reduces printer output efficiency because of the time involved in the replacement.

BRIEF DESCRIPTION OF THE DRAWINGS

The present embodiments will now be described, by way of example, with reference to the accompanying drawings, in which:

FIG. 4 shows a table that contains an example of blanket history data, according to an example implementation;

FIGS. 5a, 5b, and 5c show example results of calculations made by a print job ranking algorithm to determine the presence of a wear defect and the resulting dimensions of the healthy area of an image transfer blanket, according to example implementations FIGS. 6, 7, and 8, show flowcharts of example methods related to implementing a print job ranking algorithm that ranks print jobs into a printing order based on a healthy area of an image transfer blanket, according to different example implementations.

Throughout the drawings, identical reference numbers designate similar, but not necessarily identical, elements.

DETAILED DESCRIPTION

Overview

Figure 1:
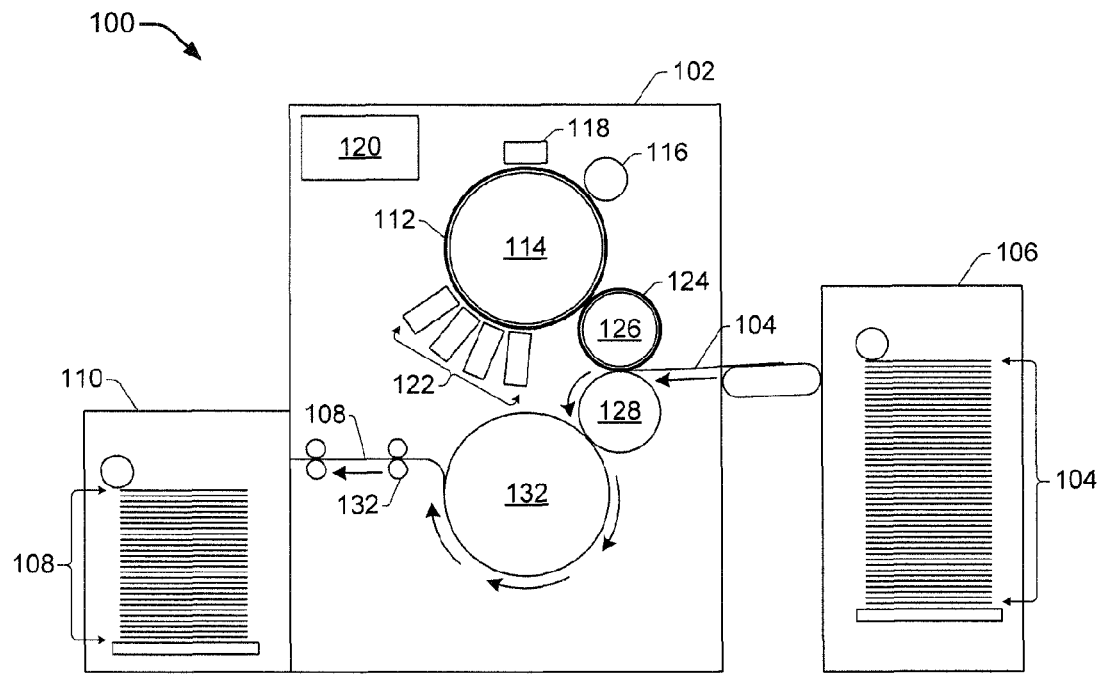
FIG. 1 illustrates a printing device suitable for implementing a print job ranking algorithm that ranks print jobs into a printing order based on a healthy area of an image transfer blanket, according to an example implementation.

As noted above, image transfer blankets used in printing devices, such as liquid electro-photography (LEP) printing devices, are typically replaced on a periodic basis due to wear in the blankets caused by the repeated transfer of images onto print media and repeated interaction with media. Blanket wear can cause defects in the transferred images, which in turn reduces overall print quality. One common example of blanket wear is cut-marks that can develop on the blanket due to the sharp edges of the printed substrates (i.e., the print media). The repeated pressing of the print media (e.g., paper) against the blanket causes the sharp edges of the media to cut into the blanket. Subsequently, when images are printed in areas that extend beyond the cut-marks (e.g., when a larger image is printed), the ink in the cut-mark areas does not transfer well to the print media, and the cut-marks become visible as defects on the printed output. While this disclosure uses image transfer blankets as a typical example, the concepts discussed herein are not limited in this regard, but are instead intended to be broadly applicable to other currently existing or future developed image transfer members.

Another common example of wear to an image transfer blanket comes from "image memory" caused by previously printed images. If an image is printed many times (i.e., the same image), so that ink is repeatedly applied to the same areas of the blanket while being repeatedly left off of other areas of the blanket, the blanket becomes damaged in those areas where no ink is being applied. Subsequently, when a different image is printed that calls for the application of ink onto the blanket in areas where ink has not been previously applied, the appearance of the printed image varies between those areas where ink had been previously applied and those areas where ink had not been previously applied.

The appearance of these and other wear mechanisms on printed output will typically result in the replacement of an image transfer blanket by printer device operators. However, replacing image transfer blankets is both expensive and time consuming. In addition, replacing an image transfer blanket reduces the output efficiency of the printing device, because the printing device sits idle while the blanket is being replaced. Accordingly, efforts to reduce the impact of wear on image transfer blankets and improve the useful lifespan of blankets are ongoing.

Embodiments of the present disclosure extend the useful lifespan of an image transfer blanket by prioritizing print jobs based on a healthy area of the blanket and the likelihood that each job will not result in visible print defects when printed. Print jobs are ranked in a print order from a lowest to highest risk that they will display a blanket related print defect. A job ranking algorithm evaluates historical blanket data to determine when damage (i.e., a defect) is likely to be present on the blanket. When the algorithm determines a high enough probability of damage to the blanket, the algorithm then calculates an area of the blanket that can be regarded as a healthy area. From a list of potential print jobs, the algorithm then generates a ranked print order that prioritizes each job based on a relative risk that the job will have a print quality problem given the blanket's present condition and healthy area. When the risk of a print quality problem is equivalent between one or more print jobs, the algorithm considers a second factor in generating the print order. The second factor considered is the potential for each print job to cause additional damage to the blanket and further reduce the size of the blanket's healthy area.

In an example implementation, a processor-readable medium stores code representing instructions that when executed by a processor cause the processor to access a list of print jobs for printing. The processor determines a healthy area of a transfer media. Then, for each job in the list, the processor calculates an image risk area (IRA) based on the healthy area. The processor then ranks each job in a print order according to its IRA.

In another example implementation, a processor-readable medium stores code representing instructions that when executed by a processor cause the processor to calculate a healthy area of an image transfer blanket. The processor then calculates an image risk area (IRA) as an amount of image area of a print job that falls outside of the healthy area of the image transfer blanket. The processor then ranks the print job in a print order so that it is above other print jobs having larger IRAs and below other print jobs having smaller IRAs.

In another example implementation, a processor-readable medium stores code representing instructions that when executed by a processor cause the processor to determine a healthy area of an image transfer blanket. The processor accesses a list of print jobs, with each print job defining an image area. For each print job, the processor determines an image risk area (IRA) that defines an amount of the image area that falls outside of the healthy area, and a potential damage area (PDA) that defines an amount of the healthy area that is not covered by the image area. The processor then ranks the print jobs in a print order based on the IRA and PDA of each print job. In one example, the processor first ranks the print jobs from smallest IRA to largest IRA, and where two or more print jobs have equivalent IRAs, the processor ranks the two or more print jobs from smallest PDA to largest PDA.

Illustrative Embodiments

FIG. 1 illustrates an example of a printing device 100 suitable for implementing a print job ranking algorithm that prioritizes (i.e., ranks) print jobs into a printing order based on a healthy area of an image transfer blanket and the likelihood that each job will not incur visible print defects when printed. The printing device 100 comprises a print-on-demand device, such as a liquid electro-photography (LEP) printer comprising an image transfer blanket (or other suitable image transfer media) that sustains wear from the repetitious transfer of images onto print media, as noted above. A printing device 100 implemented as an LEP printer 100 includes a print engine 102 that receives print media 104 (e.g., cut-sheet paper) from a media input mechanism 106, and outputs printed media 108 to a media output mechanism 110. The print engine 102 includes a photo imaging component, such as a photo imaging plate (PIP) 112 mounted on a drum or imaging cylinder 114. The PIP 112 defines an outer surface of the imaging cylinder 114 on which images can be formed. A charging component such as charge roller 116 generates electrical charge that flows toward the PIP surface and covers it with a uniform electrostatic charge.

A laser imaging unit 118 exposes image areas on the PIP 112, which dissipates (neutralizes) the charge in those areas. Exposure of the PIP creates a 'latent image' in the form of an invisible electrostatic charge pattern that replicates the image to be printed. In a digital LEP printing device 100, the image is created from digital image data that represents words, pages, text and images that can be created, for example, with electronic layout and/or desktop publishing programs. A controller 120 uses digital image data to control the laser imaging unit 118 to selectively expose the PIP 112. Digital image data is generally formatted as one or more print jobs stored and executed on controller 120, as further discussed herein below.

Ink is then developed to the latent, electrostatic image on the PIP 112 by binary ink development (BID) rollers 122, forming an ink image on the outer surface of the PIP 112. The ink image formed on the outer surface of the PIP 112 is electrically transferred to an image transfer blanket 124, which is electrically charged through an intermediate drum or transfer cylinder 126. The image transfer blanket 124 overlies, and is securely attached to, the outer surface of the transfer cylinder 126. The transfer cylinder 126 is configured to heat the blanket 124, which causes the liquid in the ink to evaporate and the solid particles to partially melt and blend together, forming a hot adhesive liquid plastic. The heated ink image is then transferred to the print media 104, which is held by an impression cylinder 128.

During the transfer from the image transfer blanket 124 to the print media 104, the print media 104 is pinched between the impression cylinder 128 and the blanket 124 on the transfer cylinder 126. It is the repeated pressing of print media 104 by the impression cylinder 128 into the image transfer blanket 124 that creates wear on the blanket 124. More specifically, the repeated impressions of print media 104 into the blanket 124 results in permanent deformations and defects in the blanket 124 (e.g., cut-marks from print media edges) that can impact print quality. Once the ink image has been transferred to the print media 104, the printed media 108 is transported by various rollers 132 to the output mechanism 110.

Figure 2:
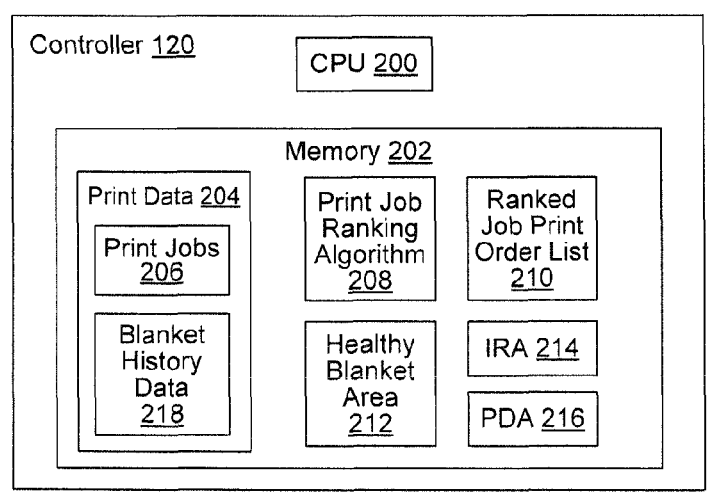
FIG. 2 shows a box diagram of a controller suitable for implementing a print job ranking algorithm within an LEP printing device, according to an example implementation.

FIG. 2 shows a box diagram of a controller 120 suitable for implementing a print job ranking algorithm within an LEP printing device 100. Controller 120 generally comprises a processor (CPU) 200 and a memory 202, and may additionally include firmware and other electronics for communicating with and controlling the other components of print engine 102, as well as media input and output mechanisms 106 and 110. Memory 202 can include both volatile (i.e., RAM) and nonvolatile (e.g., ROM, hard disk, floppy disk, CD-ROM, etc.) memory components comprising non-transitory computer/processor-readable media that provide for the storage of computer/processor-readable coded instructions, data structures, program modules, JDF, and other data.

As noted above, controller 120 uses digital image data to control the laser imaging unit 118 in the print engine 102 to selectively expose the PIP 112. More specifically, controller 120 receives print data 204 from a host system, such as a computer, and stores the data 204 in memory 202. Data 204 represents, for example, documents or image files to be printed. As such, data 204 forms one or more print jobs 206 for printing device 100 that each include print job commands and/or command parameters. Using a print job 206 from data 204, controller 120 controls components of print engine 102 (e.g., laser imaging unit 118) to form characters, symbols, and/or other graphics or images on print media 104.

In one implementation, controller 120 includes a print job ranking algorithm 208 stored in memory 202. Print job ranking algorithm 208 comprises instructions executable on processor 200 to determine a ranked or prioritized order for printing available print jobs 206. In one example, the algorithm 208 generates a ranked job print order list 210 that places the jobs in a prioritized order for printing. In general, the ranking algorithm 208 ranks each of the print jobs 206 in a prioritized print order based on one or two (or more) factors associated with a calculated healthy area 212 of the image transfer blanket 124. The first factor is an image risk area (IRA) 214 calculated for each print job 206, and the second factor is a potential damage area (PDA) 216, also calculated for each print job 206.

Figure 3:
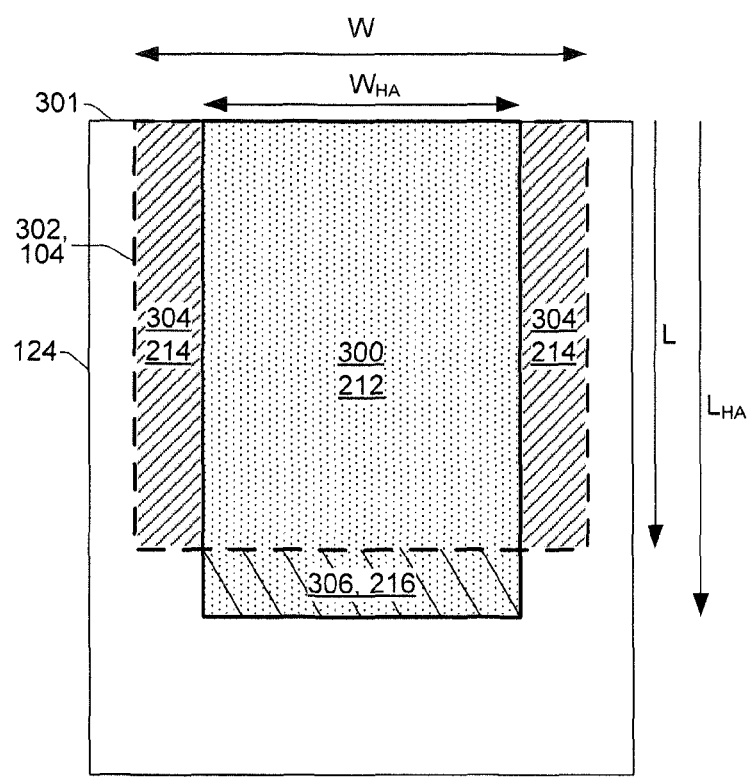
FIG. 3 shows an image transfer blanket with a healthy area and an image area on which an image of a print job is to be printed, according to an example implementation.

FIG. 3 shows an example of an image transfer blanket 124 with a healthy area 300 and an image area 302 on which an image of a print job 206 is to be printed, according to one implementation. The image area 302 is defined by the dashed line in FIG. 3. In this example, the image area 302 is assumed to be the same size as the print media 104 substrate area on which the image of a print job 206 is to be printed. Thus, both the image area 302 and the print media 104 substrate are defined by the dashed line, as shown in FIG. 3. However, in other examples, the image area 302 may be smaller than the print media 104 substrate area. In such cases, the size of an image from a print job 206 falls within the image area 302, but the image area 302 is smaller than the area of the print media 104 substrate and does not extend over the entire area of the print media 104 substrate.

The healthy area 300 shown in FIG. 3 represents a graphical illustration that corresponds with the healthy area 212 numerical value calculated and stored in the memory 202 as noted above regarding FIG. 2. The healthy area 300 of the blanket 124 represents an area of the blanket that is capable of transferring images from the PIP 112 to the print media 104 without transferring defects from the blanket 124 to the media 104. In general, areas outside of the healthy area 300 are unhealthy, and can result in defects being transferred to printed images. However, in some examples, unhealthy areas can also be confined within the healthy area 300. Such a confined unhealthy area might arise due to the constant printing of a label or other constant image. Therefore, the healthy area 300 may not always be a complete region, but may include within it, an unhealthy area. The print job ranking algorithm 208 determines the healthy blanket area 300 based on the blanket's history data 218. The blanket history data 218 comprises data for each of the print jobs previously printed on printing device 100.

FIG. 4 shows a table that contains an example of blanket history data 218. Blanket history data 218 can include, for example, the lengths, widths, and thicknesses of previously printed pages, along with the number of impressions made on the blanket 124 by pages of varying dimensions. Using the blanket history data 218, the ranking algorithm 208 determines if there is a wear defect in the blanket 124 by calculating a cumulative thickness of print media 104 that has been impressed onto the blanket 124 for the various sizes and types of print media 104 previously printed by printing device 100. Wear is often manifest as cut-marks on the blanket 124 caused by the edges of the print media as the number of impressions increases. When the amount of wear exceeds a threshold for a given dimension on the blanket 124, a wear defect is determined to be present outside of that dimension, and the healthy area 300 is determined to be within that dimension.

FIGS. 5*a*, 5*b*, and 5*c* show example results of calculations made by the ranking algorithm 208 to determine the presence of a wear defect and the resulting dimensions of the healthy area 300 of the blanket 124. Wear is the cumulative thickness of print media 104 that has been impressed onto the blanket 124, and is calculated as the thickness of the print media 104 multiplied by the impressions count. The algorithm 208 considers a wear defect to be present when the wear exceeds a threshold, which in this example is 500,000 microns of accumulated thickness. In a first calculation, the algorithm determines if there is a wear defect based on the number of impressions made by media according to the media lengths. Thus, using the blanket history data 218 shown in FIG. 4, the algorithm 208 determines that for both the media lengths of 450 mm (from print jobs 1 and 3) and 420 mm (from print jobs 2, 4, and 5), the amount of wear exceeds the 500,000 threshold. Accordingly, as shown in FIG. 5*a*, wear defects are determined to be present at blanket lengths of 450 mm and 420 mm. That is, wear defects are determined to be present at lengths of 450 mm and 420 mm from the beginning point 301 (FIG. 3) of the blanket. In a second similar calculation, using the blanket history data 218 shown in FIG. 4, the algorithm determines if there is a wear defect based on the number of impressions made by media according to the media widths. As shown in FIG. 5*b*, a wear defect is determined to be present at a blanket width of 320 mm (from print jobs 1 and 3), but not at widths of 297 mm (from print jobs 2 and 5) and 266 mm (from print job 4).

The dimensions of the healthy area 300 are then determined based on the length and width dimensions that are found to have wear defects. Specifically, the length of the healthy area 300 is determined to be the minimum length defect (i.e., 420 mm) plus a tolerance for simplex jobs and duplex jobs. In this example, a simplex job tolerance is 3 mm, and a duplex job tolerance is 10 mm. Likewise, the width of the healthy area 300 is determined to be the minimum width defect (i.e., 320 mm) plus a width tolerance. In this example, the width tolerance is 6 mm. Accordingly, as shown in FIG. 5*c*, the healthy area 300 of the blanket 124 is determined to be a length of 423 mm and width of 326 mm for simplex print jobs, and a length of 430 mm and width of 326 mm for duplex print jobs.

It is noted that other criteria and methods can be used to determine the healthy area 300 of an image transfer blanket 124, and that those described above with respect to FIGS. 4 and 5 are provided by way of example only. For example, other criteria for determining wear defects and a healthy blanket area can include monitoring which areas of the blanket 124 receive ink and which areas do not receive ink for each print job/image printed. Blankets 124 have "image memory", and they tend to age differently and be damaged in areas where little or no ink is being transferred. The image memory is a measurable condition that provides another example of how the healthy area 300 of a blanket can be determined.

Referring again to FIG. 3, in addition to the healthy area 300 of the image transfer blanket 124 and the image area 302, an image risk area (IRA) 304, and a potential damage area (PDA) 306, are also shown. Like the healthy area 300, the IRA 304 and PDA 306 shown in FIG. 3 represent graphical illustrations that correspond with IRA 214 and PDA 216 numerical values calculated and stored in the memory 202, as noted above regarding FIG. 2. As noted above, in the FIG. 3 example the image area 302 and the print media 104 substrate area are assumed to be the same size, as shown by the dashed line. For different print jobs 206, the image area 302, print media 104 substrate area, IRA 304, and PDA 306 may vary, but within a given print job 206, the image area 302, print media 104 substrate area, IRA 304, and PDA 306 remain the same.

As noted above, the IRA 304 (214 in FIG. 2), and PDA 306 (216 in FIG. 2), are the two factors whose values are calculated and considered by the ranking algorithm 208 to prioritize the print jobs 206 in a print order (i.e., a ranked job print order list 210). The IRA 304 is the amount of image area 302 that falls on the blanket 124 outside of the healthy area 300 of the blanket. The PDA 306 is the amount of the healthy area 300 of the blanket 124 that the image area 302 (print media 104 substrate) does not cover. Thus, a print job 206 whose image area 302 does not cover the entire healthy area 300 of the blanket 124, creates the potential to cause additional damage to the blanket in the PDA 306, which can further reduce the size of the healthy area 300.

The ranking algorithm 208 calculates the IRA 304 and PDA 306 of a print job 206 using the image area 302 width (W) and length (L), and the healthy area 300 width ($W_{HA}$) and length ($L_{HA}$), as shown in FIG. 3. Since the IRA 304 is the amount of image area 302 that falls outside of the healthy area 300 of the blanket 124, and the PDA 306 is the amount of the healthy area 300 of the blanket 124 that the image area 302 (print media 104 substrate area) does not cover, the IRA and PDA are readily calculated by algorithm 208 from equations as shown in the following table.

TABLE

Definitions: $\Delta W = W - W_{HA}$
$\Delta L = L - L_{HA}$

| When:<br>$\Delta W \leq 0$ & $\Delta L \leq 0$ | When:<br>$\Delta W > 0$ & $\Delta L > 0$ | When:<br>$\Delta W \leq 0$ & $\Delta L > 0$ | When:<br>$\Delta W > 0$ & $\Delta L \leq 0$ |
|---|---|---|---|
| IRA = 0 | IRA =<br>$(W_{HA} \times L_{HA}) - (W \times L)$ | IRA = $\Delta L \times W$ | IRA = $\Delta W \times L$ |
| PDA =<br>$(W_{HA} \times L_{HA}) - (W \times L)$ | PDA = 0 | PDA = $|\Delta W| \times L_{HA}$ | PDA = $|\Delta L| \times W_{HA}$ |

After calculating the IRA 304 and PDA 306 values for each print job 206, the ranking algorithm 208 sorts the print jobs first by the IRA 304 values, from the smallest IRA to the largest IRA. Thus, a ranked print order 210 is determined in which jobs with smaller IRA 304 values are ranked ahead of (and will be printed before) jobs with larger IRA 304 values. Where two or more print jobs 206 have an equivalent IRA 304 value that falls within a tolerance (e.g., a tolerance of 100 mm$^2$), the algorithm next ranks or prioritizes those jobs amongst themselves based on their PDA 306 values. Jobs with equivalent IRA values are ranked so that jobs with smaller PDA values are ranked above jobs having larger PDA values. Thus, in circumstances where all print jobs 206 have different IRA 304 values, the print jobs will be ranked based on their IRA values alone, without resorting to the PDA values for ranking. If two or more print jobs 206 have both equivalent IRA 304 values and equivalent PDA 306 values (e.g., within a tolerance of 100 mm$^2$), the algorithm 208 ranks the print jobs with the same priority such that their print order amongst themselves is irrelevant.

The ranked job print order list 210 enables the printing device 100 to continue printing on a partially defective image transfer blanket 124 with a reduced risk that the printed output will show defects from the blanket 124. This allows print operators to extend the lifespan of image transfer blankets, which reduces costs and improves printing efficiency.

Figure 6:
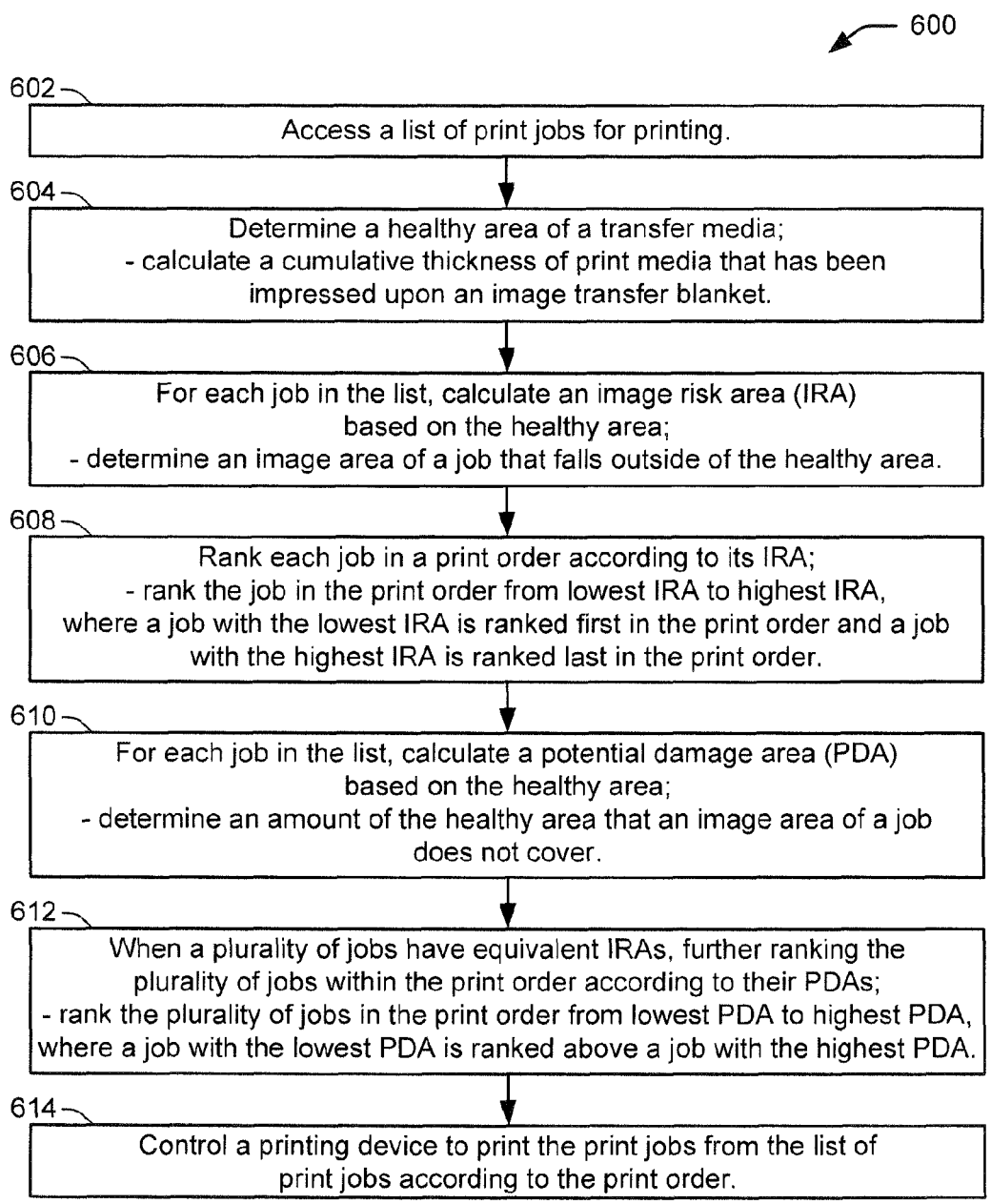
Figure 8:
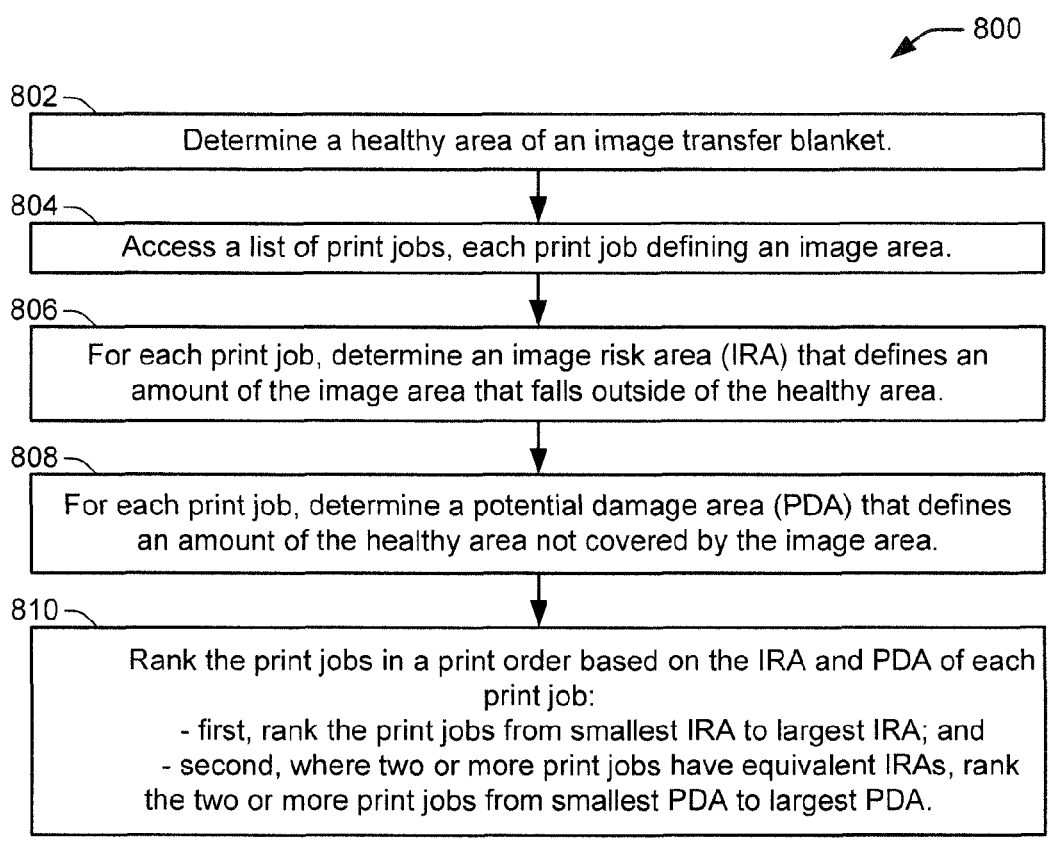

FIGS. 6, 7, and 8, show flowcharts of example methods 600, 700, and 800, related to implementing a print job ranking algorithm that ranks print jobs into a printing order based on a healthy area of an image transfer blanket and the likelihood that each job will not incur visible print defects when printed. Methods 600, 700, and 800, are associated with the example implementations discussed above with regard to FIGS. 1-6, and details of the steps shown in methods 600, 700, and 800, can be found in the related discussion of such implementations. The steps of methods 600, 700, and 800, may be embodied as programming instructions stored on a non-transitory computer/processor-readable medium, such as memory 202 of FIG. 2. In different examples, the implementation of the steps of methods 600, 700, and 800, is achieved by the reading and execution of such programming instructions by a processor, such as processor 200 of FIG. 2. Methods 600, 700, and 800, may include more than one implementation, and different implementations of methods 600, 700, and 800, may not employ every step presented in the flowcharts. Therefore, while steps of methods 600, 700, and 800, are presented in a particular order within the flowcharts, the order of their presentation is not intended to be a limitation as to the order in which the steps may actually be implemented, or as to whether all of the steps may be implemented. For example, one implementation of method 600 might be achieved through the performance of a number of initial steps, without performing one or more subsequent steps, while another implementation of method 600 might be achieved through the performance of all of the steps.

Referring to FIG. 6, method 600 begins at block 602, where the first step shown is to access a list of print jobs for printing. Such print jobs may be, for example, a group of print jobs stored in a memory of a printing device. At block 604, method 600 continues with determining a healthy area of a transfer media. In one example, determining a healthy area of a transfer media includes calculating a cumulative thickness of print media that has been impressed upon an image transfer blanket. An image risk area (IRA) is then calculated for each job in the list based on the healthy area, as shown at block 606. Calculating the IRA comprises determining an amount of an image area (i.e., print media substrate) of a print job that falls outside of the healthy area. At block 608, the method 600 continues with ranking each job in a print order according to its IRA. Ranking a print job comprises ranking the job in the print order from lowest IRA to highest IRA, where a job having the lowest IRA is ranked first in the print order and a job having the highest IRA is ranked last in the print order. A potential damage area (PDA) is then calculated for each job in the list based on the healthy area, as shown at block 610. Calculating a PDA comprises determining an amount of the healthy area that an image area (i.e., print media substrate) of a job does not cover. As shown at block 612, when a plurality of jobs have equivalent IRAs, the plurality of jobs is further ranked within the print order according to their PDAs. Ranking the plurality of jobs with equivalent IRAs comprises ranking them in the print order from lowest PDA to highest PDA, where a job with the lowest PDA is ranked above a job with the highest PDA. The method 600 concludes at block 614, with the step of controlling a printing device to print the print jobs from the list of print jobs according to the print order.

Referring to FIG. 7, method 700 begins at block 702, where the first step shown is to calculate a healthy area of an image transfer blanket. In one example, calculating a healthy area of an image transfer blanket comprises calculating wear as a cumulative thickness of print media printed on the image transfer blanket, determining that a defect is present in the image transfer blanket when the wear exceeds a threshold, and establishing a length dimension and width dimension of the healthy area based on lengths and widths of the print media whose cumulative thickness caused the wear to exceed the threshold. The method 700 continues at block 704 with calculating an image risk area (IRA). The IRA is as an amount of an image area of a print job that falls outside of the healthy area of the image transfer blanket. In one example, where the print job image area has width, W, and length, L, and the healthy area has width, $W_{HA}$, and length, $L_{HA}$, the IRA is calculated from an equation selected from the group consisting of, IRA=0, IRA=$(W_{HA} \times L_{HA})$−$(W \times L)$, IRA=$(L-L_{HA}) \times W$, and, IRA=$(W-W_{HA}) \times L$. The choice of which equation is used is determined by the differences in lengths and widths of the print job image area and the healthy area, as shown in the Table herein above. At block 706, the print job is ranked in a print order so that it is above other print jobs having larger IRAs and below other print jobs having smaller IRAs. As shown at block 708, a potential damage area (PDA) is calculated as an amount of the healthy area that is not covered by the image area of the print job (i.e., print media 104 substrate area). In one example, where the print job image area has width, W, and length, L, and the healthy area has width, $W_{HA}$, and length, $L_{HA}$, the PDA is calculated from an equation selected from the group consisting of, PDA=0, PDA=$(W_{HA} \times L_{HA})$−$(W \times L)$, PDA=$|W-W_{HA}| \times L_{HA}$, and, PDA=$|L-L_{HA}| \times W_{HA}$. The choice of which equation is used is determined by the differences in lengths and widths of the print job image area and the healthy area, as shown in the Table herein above. As shown at block 710, where the IRA of the print job is the same as an IRA of a second print job: the print job is ranked above the second print job when the PDA is smaller than a PDA of the second print job; the print job is ranked below the second print job when the PDA is larger than the PDA of the second print job; and, the print job is ranked even with (i.e., the same as) the second print job when the PDA is the same as the PDA of the second print job.

Referring to FIG. 8, method 800 begins at block 802, where the first step shown is to determine a healthy area of an image transfer blanket. At block 804, a list of print jobs is accessed. Each print job in the list define an image area. For each print job, an image risk area (IRA) is determined that defines an amount of the image area that falls outside of the healthy area, as shown at block 806. Also, for each print job, a potential damage area (PDA) is determined that defines an amount of the healthy area that is not covered by the image area, as shown at block 808. At block 810, the print jobs are ranked in a print order based on the IRA and PDA of each print job. Ranking the print jobs based on the IRA and PDA comprises, first, ranking the print jobs from smallest IRA to largest IRA, and second, where two or more print jobs have equivalent IRAs, ranking the two or more print jobs from smallest PDA to largest PDA.

What is claimed is:

1. A non-transitory processor-readable medium storing code representing instructions that when executed by a processor cause the processor to:
    access a list of print jobs for printing;
    determine a healthy area of an image transfer blanket, wherein the healthy area represents an area of the image transfer blanket that is to transfer images from a photo imaging plate to a print media without transferring defects from the image transfer blanket to the print media;
    for each print job in the list of print jobs, calculate an image risk area (IRA) based on the determined healthy area, wherein the IRA is an amount of an image area of the print job that falls on the image transfer blanket outside of the healthy area of the image transfer blanket;
    rank each print job in the list of print jobs in a print order according to the calculated IRA of the print job; and
    control a printing device to print the print jobs from the list of print jobs according to the ranked print order.

2. The non-transitory processor-readable medium as in claim 1, wherein to rank each print job, the instructions are to cause the processor to rank the print job in the print order from lowest IRA to highest IRA, where a print job with the lowest IRA is ranked first in the print order and a job with the highest IRA is ranked last in the print order.

3. The non-transitory processor-readable medium as in claim 1, wherein the instructions further cause the processor to:
    for each print job in the list, calculate a potential damage area (PDA) based on the healthy area, wherein the PDA of a print job is an amount of the healthy area of the image transfer blanket that the image area of the print job does not cover; and
    when a plurality of print jobs have equivalent IRAs, further rank the plurality of print jobs within the print order according to the calculated PDAs of the print jobs.

4. The non-transitory processor-readable medium as in claim 3, wherein to further rank the plurality of jobs according to the calculated PDAs, the instructions are further to cause the processor to rank the plurality of print jobs in the print order from lowest PDA to highest PDA, where a print job with the lowest PDA is ranked above a print job with the highest PDA.

5. The non-transitory processor-readable medium as in claim 1, wherein to determine a healthy area of an image transfer blanket, the instructions are further to cause the processor to:
    calculate a cumulative thickness of print media that has been impressed upon the image transfer blanket.

6. A non-transitory processor-readable medium storing code representing instructions that when executed by a processor cause the processor to:
    calculate a healthy area of an image transfer blanket, wherein the healthy area represents an area of the image transfer blanket that is to transfer images from a photo imaging plate to a print media without transferring defects from the image transfer blanket to the print media;
    calculate an image risk area (IRA) as an amount of image area of a print job that falls outside of the healthy area of the image transfer blanket;
    rank the print job in a print order so that the print job is above other print jobs having larger IRAs and below other print jobs having smaller IRAs; and
    control a printing device to print the print jobs according to the ranked print order.

7. The non-transitory to him processor-readable medium as in claim 6, wherein the instructions further cause the processor to:
    calculate a potential damage area (PDA) as an amount of the healthy area not covered by the image area of the print job; and
    where the IRA of the print job is the same as an IRA of a second print job, rank the print job above the second print job when the PDA is smaller than a PDA of the second print job, below the second print job when the PDA is larger than the PDA of the second print job, and even with the second print job when the PDA is the same as the PDA of the second print job.

8. The non-transitory processor-readable medium as in claim 6, wherein to calculate a healthy area the instructions are further to cause the processor to:
calculate wear as a cumulative thickness of print media printed on the image transfer blanket;
determine a defect in the image transfer blanket when the wear exceeds a threshold; and
establish a length dimension and width dimension of the healthy area based on lengths and widths of print media whose cumulative thickness caused the wear to exceed the threshold.

9. The non-transitory processor-readable medium as in claim 6, wherein the image area of the print job has width, W, and length, L, and the healthy area has width, $W_{HA}$, and length, $L_{HA}$, and the IRA is calculated from an equation selected from the group consisting of, IRA=0, IRA=$(W_{HA} \times L_{HA})-(W \times L)$, IRA=$(L-L_{HA}) \times W$, and, IRA=$(W-W_{HA}) \times L$.

10. The non-transitory processor-readable medium as in claim 7, wherein the image area of the print job has width, W, and length, L, and the healthy area has width, $W_{HA}$, and length, $L_{HA}$, and the PDA is calculated from an equation selected from the group consisting of, PDA=0, PDA=$(W_{HA} \times L_{HA})-(W \times L)$, PDA=$|W-W_{HA}| \times L_{HA}$, and, PDA=$|L-L_{HA}| \times W_{HA}$.

11. A non-transitory processor-readable medium storing code representing instructions that when executed by a processor cause the processor to:
determine a healthy area of an image transfer blanket, wherein the healthy area represents an area of the image transfer blanket that is to transfer images from a photo imaging plate to a print media without transferring defects from the image transfer blanket to the print media;
access a list of print jobs, each print job defining an image area;
for each print job, determine an image risk area (IRA) that defines an amount of the image area that falls outside of the healthy area;
for each print job, determine a potential damage area (PDA) that defines an amount of the healthy area not covered by the image area;
rank the print jobs in a print order based on the IRA and PDA of each print job; and
control a printing device to print the print jobs according to the ranked print order.

12. The non-transitory processor-readable medium as in claim 11, wherein to rank the print jobs in a print order based on the IRA and PDA of each print job the instructions are further to cause the processor to:
first, rank the print jobs from smallest IRA to largest IRA; and
second, where two or more print jobs have equivalent IRAs, rank the two or more print jobs from smallest PDA to largest PDA.

* * * * *